UNITED STATES PATENT OFFICE.

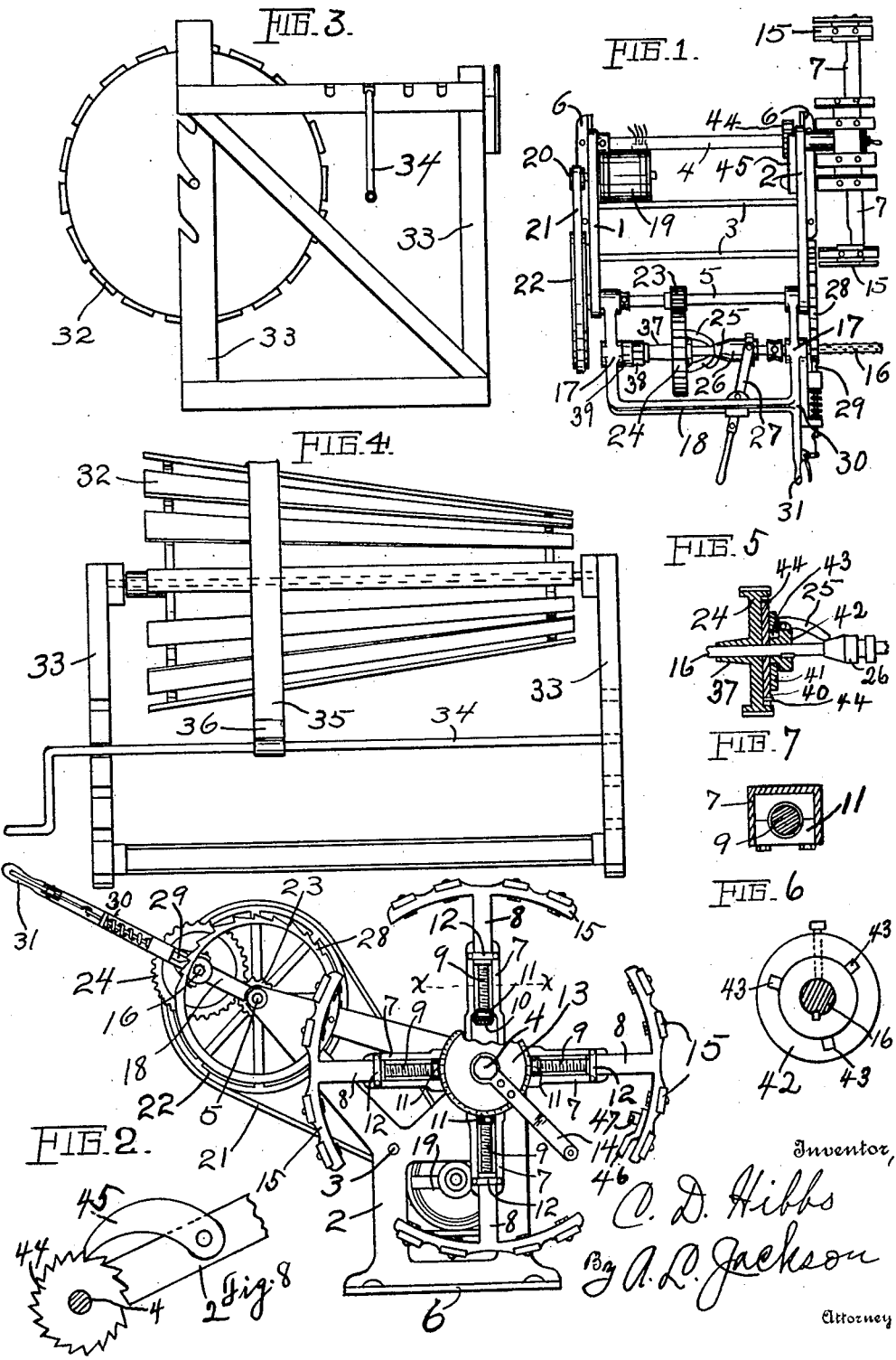

CASSELL D. HIBBS, OF FORT WORTH, TEXAS.

FABRIC-STRIPPING MACHINE.

1,402,067. Specification of Letters Patent. Patented Jan. 3, 1922.

Application filed February 24, 1919. Serial No. 278,601.

*To all whom it may concern:*

Be it known that I, CASSELL D. HIBBS, a citizen of the United States of America, residing at Fort Worth, in the county of Tarrant and State of Texas, have invented certain new and useful Improvements in Fabric-Stripping Machines, of which the following is a specification.

My invention relates to a fabric stripping machine, and the object is to provide simple machines that will be highly efficient in stripping fabric and more particularly for stripping fabric from discarded pneumatic tire casings. Much of such fabric is useful in rebuilding and manufacturing tire casings when removed without being torn to pieces. The object of this invention is to provide machines by which such fabric can be removed from old tire casings without tearing the fabric and provide either manually or power operated machines. Other objects and advantages will be fully explained in the following description and the invention will be more particularly pointed out in the claims.

Reference is had to the accompanying drawings which form a part of this application.

Fig. 1 is a plan view of the machine which may be operated by a small electric motor. Fig. 2 is a side elevation of the same. Fig. 3 is a side elevation, showing a variation from the machine previously shown and showing a machine which may be operated manually. Fig. 4 is a plan view of the machine shown in Fig. 3. Fig. 5 is a detail view of the clutch operating devices shown in Fig. 1. Fig. 6 is a face view of the stationary member of the clutch. Fig. 7 is a section, taken on the line x—x of Fig. 2. Fig. 8 is a detail view of a retaining ratchet and pawl.

Similar characters of reference are used to indicate the same parts throughout the several views.

The machine is provided with a frame consisting of two upright castings 1 and 2 connected by braces 3 and shafts 4 and 5. The uprights 1 and 2 have flanges 6 for bolting to the floor or to a base. A reel is mounted on the shaft 4 and consists of four arms 7 all cast in one casting. The reel is made extensible by extensible arms 8 which are slidable in grooves in the arms 7. The arms 8 have screw threaded sockets and screw shafts 9 and beveled pinions 10 are rigid with the inner ends of the shafts 9. The shafts 9 are held in place by bearings 11 at their inner ends and by the arms 8 at their outer ends. The arms 8 are retained in the grooves in the arms 7 by straps or keepers 12. The pinions 10 are driven by a single wheel 13 which has beveled face cogs meshing with the pinions 10. A crank 14 may be used to drive the wheel 13 for extending or contracting the reel to adapt the same to hold larger tire casings or smaller tire casings. The reel has not a continuous periphery, but a continuous periphery is not necessary. The segments 15 are sufficient for the purpose set forth. The tire casing is placed on the segments 15 and the segments are tightened under the casing by turning the crank 14.

The stripping of the fabric is accomplished by a shaft 16 which is provided with small spurs for engaging and holding the end of the fabric. The shaft 16 is carried in bearings 17 in a yoke 18 which is pivotally mounted on a shaft 5 which is driven from a motor 19 which drives a pulley 20 which drives a belt 21 which drives a pulley 22 which is rigid with shaft 5. A spur pinion 23 on shaft 5 drives a spur cog wheel 24 which is loosely mounted on the shaft 16. The wheel 24 is locked to the shaft 16 for driving purposes by pivoted clutch members 25 and sliding clutch member 26 and the members 25 are connected to the shaft 16 by an ordinary key. The clutch member 26 is moved into and out of locking position by a clutch lever 27 which is fulcrumed on the yoke 18. When the operation of stripping is to be commenced, it is necessary that the shaft 16 be relatively close to the reel and to be gradually moved from the reel as the fabric increases in size on the reel. For this purpose, a circular rack 28 is mounted on the shaft 5. A spring-actuated dog 29 is mounted on a lever 30 which is rigid with the yoke 18 so that the dog 29 can be swung to any desirable position on the circular rack 28 to bring the shaft 16 closer to or further from the periphery of the stripping reel. A handle 31 is provided on the yoke 18 for convenience in swinging the yoke 18 to different positions that may be required in the operation.

The variation shown in Figs. 3 and 4 consists of a manually operated reel 32 which is cone-shaped for the purpose of adapting the reel to different sizes of tire casings from which fabric is to be stripped. The reel 32 is journaled in a suitable upright frame 33 and provision is made for journaling the reel at different heights in the frame and for journaling the stripping shaft 34 at different positions on the frame as the stripped fabric increases in size on the stripping shaft 34. Fig. 4 shows a tire casing 35 and fabric 36 being stripped therefrom.

The clutch mechanism for controlling the cog wheel 24 includes a sleeve 37 and a nut 38 against which the sleeve 37 is pressed. A lock-nut 39 is provided for locking the nut 38 in place. A fiber disk 40 bears against the wheel 24 and a steel disk 41 is pressed against the disk 40 by the pivoted members 25 which are mounted on the collar 42 which is keyed to the shaft 16. The disk 41 is loosely mounted on a reduced portion of the collar 42 and is made to rotate therewith by means of ribs 43 which are integral with the collar 42. The disk 41 has an axial movement relative to the collar so that the pivoted members 25 will press the disk 41 against the fiber disk 40 and so press the disk 40 against the wheel 24 for driving purposes. The disk 40 is made to turn with and prevented from turning without wheel 24 by pins 44. The fiber disk 40 and the nut 38 will lock the wheel 24 against axial movement on the shaft 16 and are used to take up any wear.

Various changes in the sizes, proportions, construction and arrangement of the several parts may be made without departing from my invention. In order to prevent the reel 15 from turning away from the required position, a ratchet wheel 44 is mounted on the shaft 4 and a pawl 45 is pivotally mounted on the frame 2 to engage the wheel 44. Gravity will be sufficient to hold the pawl in engagement with the wheel 44. In order to hold the work to be stripped on the reel 15, when an old casing to be stripped has been cut apart a clamp 46 may be used and a set screw 47 used to tighten the clamp 46 on the work which is held between the clamp a section of the reel 15 by bending the end of the casing under the edge of the reel section 15.

What I claim, is,—

1. A fabric stripping machine comprising a reel adaptable for holding tire casings of different diameters, a stripping shaft, means for positioning said shaft closer to or further from said reel, and means for driving said stripping shaft.

2. A fabric stripping machine comprising a reel having a segmental periphery, means for expanding or contracting said periphery to adapt the same to tire casings of different diameters, a stripping shaft, a swinging yoke carrying said shaft for positioning said shaft closer to or further from said reel, and means for driving said shaft at different positions.

3. A fabric stripping machine comprising a reel having a segmental periphery, radially movable arms carrying said periphery, screw shafts engaging said arms, gearing for driving said screw shafts, a stripping shaft, means for positioning said shaft closer to or further from said reel, and means for driving said shaft at different positions.

4. A fabric stripping machine comprising a reel having a segmental periphery, radially movable arms carrying said periphery, means for moving said arms radially, a stripping shaft, a swinging yoke carrying said shaft, a handle for moving said yoke to position said shaft closer to or further from said shaft, a circular rack, and a spring-actuated dog carried by said yoke for engaging said rack to hold said yoke in different positions.

5. A fabric stripping machine comprising a reel adaptable for holding tire casings of different diameters, a stripping shaft, a swinging yoke carrying said shaft, means for holding said yoke at different positions to bring said shaft closer to or further from said reel, a power shaft on which said yoke is mounted, a pinion rigid therewith, a gear wheel mounted loosely on said stripping shaft and meshing with said pinion, means for locking and releasing said gear wheel to and from said stripping shaft, and means for driving said power shaft.

6. A device for use in pulling one of the layers or plies of a tire therefrom, comprising a frame, means for engaging the portion of the tire to be pulled and pulling the same, and means adapted to mount the tire for rotation.

7. In a tire stripping apparatus, the combination with a supporting member having means for expanding the tire casing, a power shaft, means connected with said power shaft for engaging the end or ends of the fabric layers, means whereby upon application of power to the machine, said layer or layers may be stripped from the casing.

In testimony whereof, I set my hand, this 30th day of April, 1917.

CASSELL D. HIBBS.